United States Patent
Devereaux et al.

(10) Patent No.: US 11,754,419 B2
(45) Date of Patent: Sep. 12, 2023

(54) AUTO-DETECTION OF COMMUNICATION MODULE PROTOCOL IN UTILITY METERING SYSTEMS

(71) Applicant: Aclara Technologies LLC, St. Louis, MO (US)

(72) Inventors: Peggy R. Devereaux, St. Louis, MO (US); Oscar Lopez Aguirre, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 181 days.

(21) Appl. No.: 17/112,555

(22) Filed: Dec. 4, 2020

(65) Prior Publication Data
US 2021/0172764 A1    Jun. 10, 2021

Related U.S. Application Data

(60) Provisional application No. 62/944,038, filed on Dec. 5, 2019.

(51) Int. Cl.
*G01D 4/00* (2006.01)
*H04L 45/74* (2022.01)

(52) U.S. Cl.
CPC .............. *G01D 4/004* (2013.01); *H04L 45/74* (2013.01)

(58) Field of Classification Search
CPC .......... G01D 4/00; G01D 4/002; G01D 4/004; G01R 21/133; G05F 1/66; G06F 16/972;
(Continued)

(56) References Cited

U.S. PATENT DOCUMENTS

2001/0038343 A1   11/2001   Meyer et al.
2003/0105801 A1*  6/2003   Tse ........................ H04L 67/563
                                                      709/224
(Continued)

OTHER PUBLICATIONS

DLMS User Association. "DLMS/COSEM Architecture and Protocols." May 8, 2019 <URL; https://www.dlms.com/files/Green_Book_Edition_9-Excerpt.pdf> sec 1, 8.1.2, 8.4.1.1, 8.4c 1.2, 8.5.1.
(Continued)

*Primary Examiner* — Stephen R Burgdorf
(74) *Attorney, Agent, or Firm* — Michael Best & Friedrich LLP

(57) ABSTRACT

A metering system including a utility meter having a processing circuit and a communication module interface. The metering system also includes a communication module electronically coupled to the utility meter via the communication module interface. The communication module interface is configured to transmit information to, and receive information from, the utility meter. The processing circuit of the utility meter includes one or more electronic processors that are configured to receive a first message from the communication, read a header frame of the first message, and determine a message type of the first message based on the header frame. The electronic processors are also configured to verify the first message based on the determined message type, and process the first message based on the determined message type.

13 Claims, 3 Drawing Sheets

(58) Field of Classification Search
CPC .. G06K 7/0008; G08C 19/16; H04L 43/0876; H04L 45/74; H04L 63/0876; H04L 63/1425; H04L 63/145; H04L 69/18; H04Q 9/00; H04W 4/12
USPC .................................................. 340/870.02
See application file for complete search history.

(56) References Cited

U.S. PATENT DOCUMENTS

| | | | |
|---|---|---|---|
| 2007/0043849 A1* | 2/2007 | Lill ........................ | H04L 63/12 709/224 |
| 2007/0120705 A1* | 5/2007 | Kiiskila ................ | G01D 4/002 340/870.02 |
| 2008/0007426 A1 | 1/2008 | Morand | |
| 2008/0272933 A1* | 11/2008 | Cahill-O'Brien ........ | H04Q 9/00 340/870.02 |
| 2009/0079584 A1 | 3/2009 | Grady et al. | |
| 2010/0046545 A1* | 2/2010 | Kagan .................... | H04L 69/08 370/466 |
| 2010/0278187 A1 | 11/2010 | Hart et al. | |
| 2011/0169659 A1* | 7/2011 | Dalla ................. | H04L 12/2836 340/870.02 |
| 2013/0100987 A1* | 4/2013 | Picard ................ | H04L 27/0008 375/136 |
| 2013/0106616 A1 | 5/2013 | Gustafsson et al. | |
| 2013/0314249 A1* | 11/2013 | Le Buhan ............. | G01D 4/002 340/870.02 |
| 2014/0320305 A1 | 10/2014 | Haynes | |

OTHER PUBLICATIONS

IBM, MVS System Messages vol. 7 (IEB^IEE) Jun. 26, 2019 <https://www-01.ibm.com/servers/resourcelink/svc00100.nsf/pages/zOSV2R3sa380674/$file/iea m700_v2r3.pdf> p. 1, 65, 287.

Fouda, et al. "A lightweight message authentication scheme for smart grid communications." In: IEEE Transactions on Smart grid. Aug. 15, 2011 <URL: https://ieeexplore.ieee.org/document/5983424> entire document.

Herres. "Exploring the LIN bus with an oscilloscope." In: Test & Measurement Tips. Feb. 10, 2017 <ttps://www.testandmeasurementtips.com/exploring-lin-bux-oscilloscope/> entire document.

PCT/US2020/063384 International Search Report and Written Opinion dated Mar. 10, 2021.

* cited by examiner

AUTO-DETECTION OF COMMUNICATION MODULE PROTOCOL IN UTILITY METERING SYSTEMS

CROSS-REFERENCE TO RELATED APPLICATIONS

This application claims priority to and the benefit of U.S. Provisional Patent Application No. 62/944,038, filed Dec. 5, 2019, the contents of which are incorporated by reference herein.

FIELD

The embodiments disclosed herein relate to utility power meters.

BACKGROUND

Power meters are often supplemented with a communication module to allow for communication between the meter and the utility. The communication module may allow for wired or wireless communication with various elements of the utility, such as meter readers, central servers, technician devices, etc. These communication modules are often added to existing meters. However, different regions use different communication protocols to communicate with the utility, and this can require the meters and the associated communication modules to be configured to use the same communication protocols. This results in utilities needing to have multiple communication modules and meters that are compatible with the communication protocol used in a specific region. Accordingly, a meter configured to communicate with different communication protocols can allow for a utility to deploy different desired communication modules onto the meters, without having to ensure that the communication modules are compatible with the communication protocol of the meter. Further, by handling the communication interpretation within a meter, different brands or configurations of communication modules can be deployed within a utility system, as needed.

SUMMARY

According to one aspect, a metering system is provided. The metering system includes a utility meter having a processing circuit and a communication module interface. The metering system also includes a communication module electronically coupled to the utility meter via the communication module interface. The communication module interface is configured to transmit information to, and receive information from, the utility meter. The processing circuit of the utility meter includes one or more electronic processors that are configured to receive a first message from the communication, read a header frame of the first message, and determine a message type of the first message based on the header frame. The electronic processors are also configured to verify the first message based on the determined message type, and process the first message based on the determined message type.

According to another aspect, a method is provided for processing multiple message protocols. The method includes receiving a first message at a communication module, wherein the communication module is in electronic communication with a utility meter. The method further includes reading a header frame of the first message at an electronic processor of the utility meter, and determining a message type of the first message based on the header frame at the electronic processor of the utility meter. The method additionally includes verifying the first message based on the determined message type at the electronic processor of the utility meter, and processing the first message at the electronic processor of the utility meter based on the determined message type.

According to another aspect, a metering system is provided. The metering system includes a resource meter comprising a processing circuit and a communication module interface. The communication module is configured to transmit information to, and receive information from, the resource meter. The processing circuit of the resource meter includes one or more electronic processors configured to receive a first message from the communication module, read a header frame of the first message, and determine a message type of the first message based on the header frame. The electronic processors are also configured to verify the first message based on the determined message type and generate a second message in response to the first message. The electronic processors format the second message into a message type that is the same as the determined message type, and transmit the second message to the communication module.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
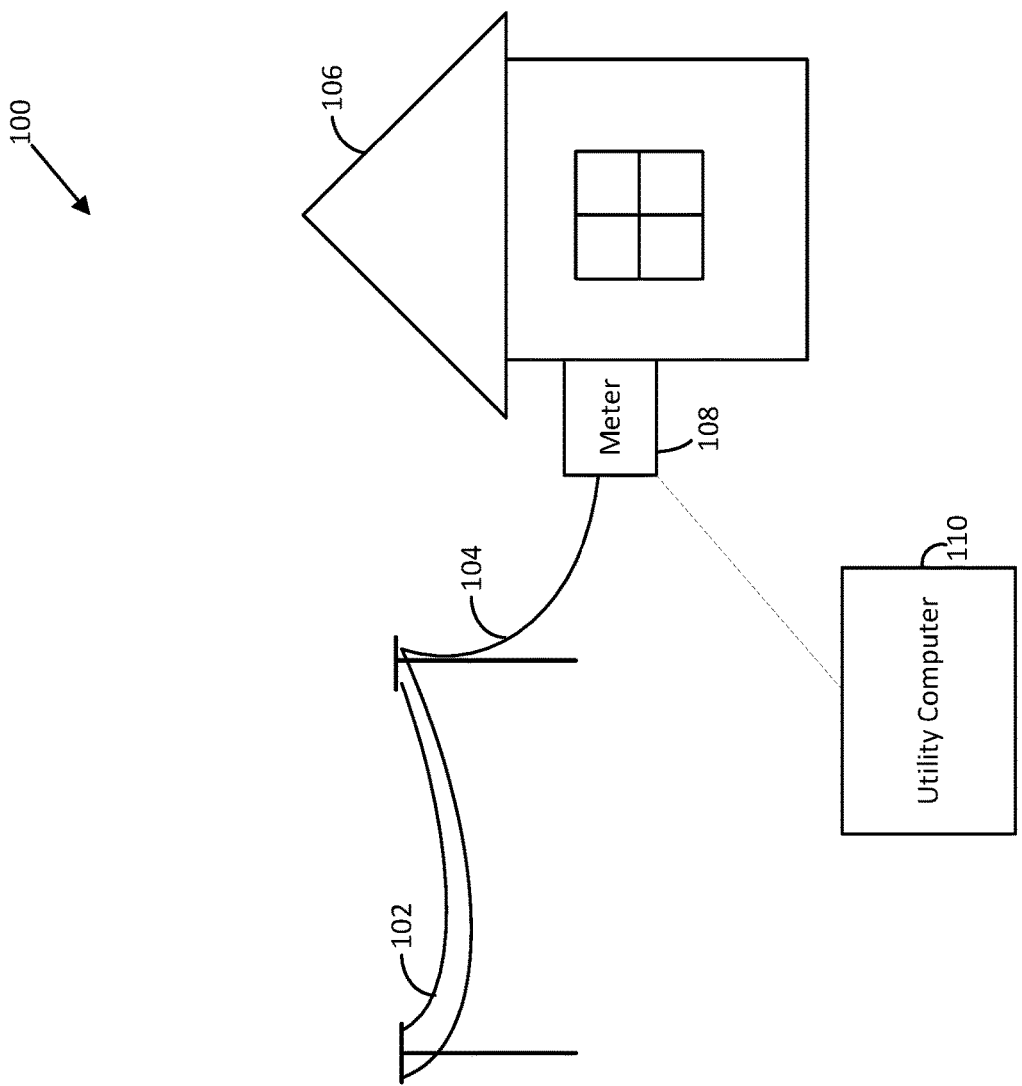
FIG. 1 is a system diagram illustrating a power distribution system, according to the description.

FIG. 1 illustrates an example residential power distribution system 100. The system 100 shows one or more power distribution lines 102 and a residential power feeder line 104. The residential power feeder line 104 supplies alternating current (AC) power to a residential home 106, via a power meter 108. While the system 100 describes a residential power distribution system, it is contemplated that the systems, devices and methods described herein can be used with residential, commercial, and/or industrial power distribution systems, and should not be limited to any particular type of power distribution system. As also shown in FIG. 1, the meter 108 is coupled to the residential power feeder line 104 and is configured to monitor parameters of the power supplied from the power distribution lines 102 (which in turn is provided by a utility, such as a fossil fuel based power plant, a nuclear power plant, wind turbines, solar collectors, etc.). Parameters can include energy usage, power factor, voltage levels, current levels, etc.

In some embodiments, the meter 108 may be configured to communicate with one or more utility computer systems 110. The utility computer system 110 may be a collection device used to communicate with multiple meters 108 in an area to collect data related to energy usage for one or more residential homes. In some embodiments, the meter 108 may communicate with the utility computer system 110 via a wireless connection, such as RF (e.g. cellular or other RF communication type). However, other communication protocols are contemplated and will be described in more detail below. In other examples, the meter 108 may communicate with the utility computer system 110 via a wired connection, such as, but not limited to, powerline communication, fiber optic communication or internet communication. In some examples, the utility computer system 110 is a portable system operated by one or more utility personnel, who move the utility computer system 110 to be within range of one or more meters 108 in a given area, thereby allowing for communication to be established between the meter 108 and the utility computer system 110. In other examples, the utility computer system 110 may be a fixed system, or may have multiple fixed receivers across a utility distribution area to allow for communication to be conducted between the meter 108 and the utility computer system 110.

Figure 2:
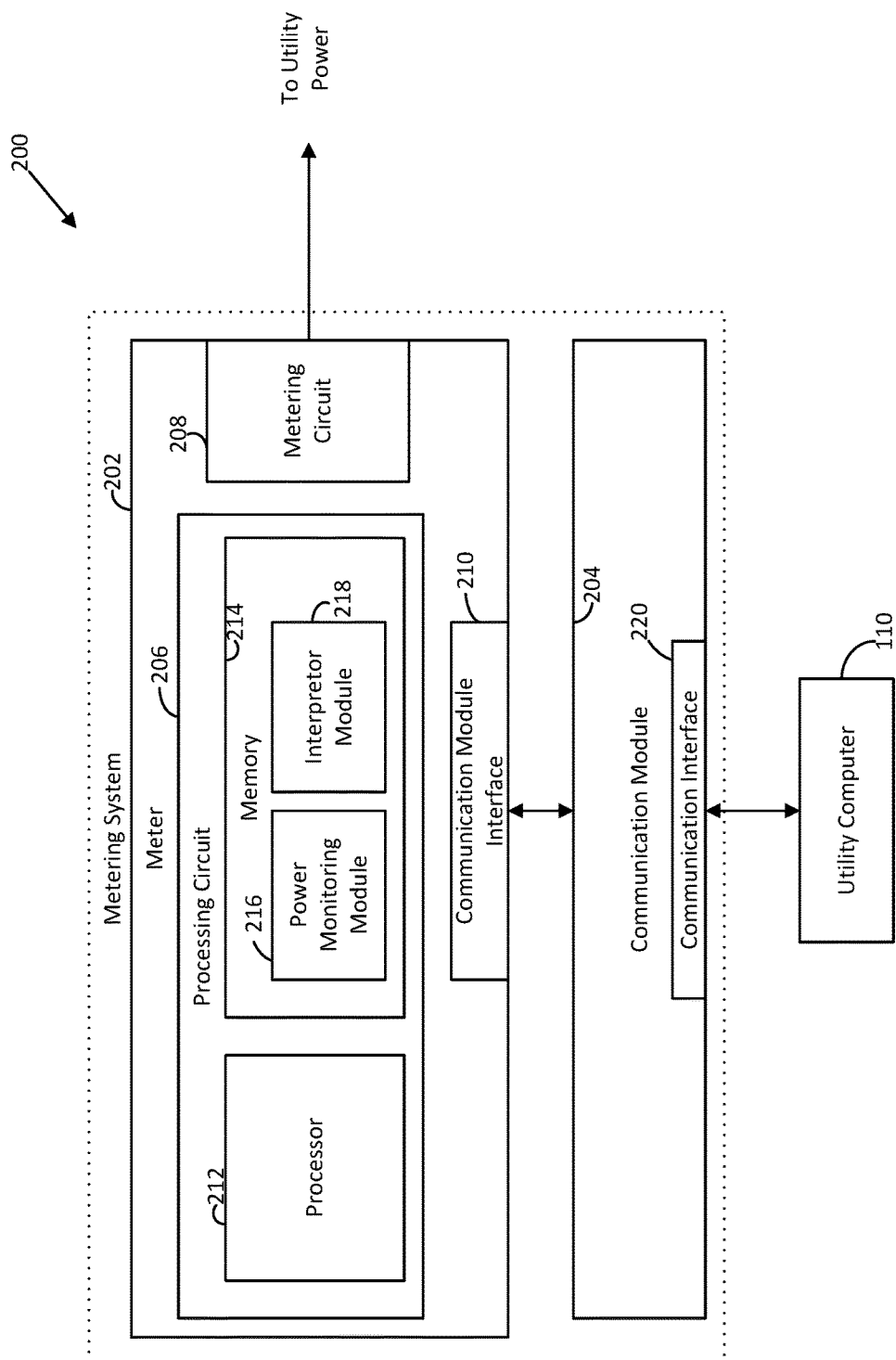
FIG. 2 is a system diagram illustrating one exemplary embodiment of a metering system, according to the description.

Turning now to FIG. 2, a block diagram of a metering system 200 is shown, according to some embodiments. In one embodiment, the metering system 200 is similar to the meter 108 described above in regards to FIG. 1. The metering system 200 may include a meter 202 and a communication module 204. The meter 202 may include a processing circuit 206, a metering circuit 208, and a communication module interface 210. The processing circuit 206 includes one or more electronic processors 212 and one or more memory devices 214. The processing circuit 206 may be communicably connected to one or more of the metering circuit 208 and the communication module interface 210. The electronic processor 212 may be implemented as a programmable microprocessor, an application specific integrated circuit (ASIC), one or more field programmable gate arrays (FPGA), a group of processing components, or with other suitable electronic processing components.

The memory 214 (for example, a non-transitory, computer-readable medium) includes one or more devices (for example, RAM, ROM, flash memory, hard disk storage, etc.) for storing data and/or computer code for completing or facilitating the various processes layers and modules described herein. The memory 214 may include database components, object code components, script components, or other types of code and information for supporting the various activities and information structure described in the present application. According to one example, the memory 214 is communicably connected to the electronic processor 212 via the processing circuit 206 and may include computer code for executing (for example, by the processing circuit 206 and/or the electronic processor 212) one or more processes described herein.

The metering circuit 208 is configured to be coupled to at least a portion of the utility power that is associated with the metering system 200. The metering circuit 208 may be configured to measure one or more parameters of the utility power, such as voltage, current being used, power factor, phase data, and the like. In one embodiment, the metering circuit 208 is configured to provide the measured data to a power monitoring module 216 within the memory 214. The power monitoring module 216 is configured to determine one or more parameters associated with the utility power monitored by the metering circuit 208. For example, the power monitoring module 216 may determine power usage (e.g. kW, kWh, VAR, VA, etc.) based on the data measured by the metering circuit 208. In other examples, the power monitoring module 216 may be configured to determine other parameters, such as power factor, phasor data, phase balance, and other applicable parameters.

The communication module interface 210 is configured to communicate with the communication module 204. In one embodiment, the communication module interface 210 communicates with the communication module 204 using a wired serial connection. In one embodiment, the serial connection uses RS-232; however other wired serial connections, such as USB, Firewire, etc. may be used. In still other examples, the wired serial connection may be a proprietary serial connection.

The communication module 204 is configured to provide communication between the meter 202 and external devices, such as utility computer systems 110. In one example, the communication module 204 can be connected to the meter 202 (e.g. via the communication module interface 210) via one or more wired connections. Furthermore, the communication module 204 may include one or more mechanical interfaces for coupling to the meter 202. In some examples, the communication module 204 is coupled to an external surface of the meter 202. In other examples, the communication module 204 may be mounted inside a housing of the meter 202.

In some examples, there may be multiple communication module 204 types, such as RF, Bluetooth, cellular (e.g. 3G, 4G, 5G, CDMA, etc.), RF, Wi-Fi, NFC, powerline communications (e.g., TWACS, PRIME, etc.) and the like. Thus, the type of communication module 204 used is dependent on how the utility would like to communicate with the meter 202. For example, if the utility uses 4G communication networks to communicate with the meter 202, then a 4G communication module 204 may be used. As shown in FIG. 2, the communication module 204 includes a communication interface 220 for communicating with the utility computer system 110. The communication interface 220 may be, or include, wireless communication interfaces (for example, antennas, transmitters, receivers, transceivers, etc.) for conducting data communications between the communication module 204 and the utility computer system 110. Based on the communication module 204 type, the communication interface 220 may use interfaces such as cellular (3G, 4G, 5G, LTE, CDMA, etc.), Wi-Fi, LoRa, LoRaWAN, Z-wave, Thread, powerline communication, short hop radio, and/or any other applicable wireless communication protocol.

As stated above, meters, such as meter 202, may use different internal communication standards. For example, meters may use communication standards based on their geographical location in order to allow for standardized operation and communication within a region. Typically, the main communication standards used were American National Standards Institute (ANSI), such as the ANSI C12.18 protocol, or International Electrotechnical Commission (IEC) communication standards, such as IEC 62056 Device Language Message Specification (DLMS)/Companion Specification for Energy Metering (COSEM). However, it is contemplated that different or additional communication protocols or standards may be used by meter 202 or communication module 204. Typically, the communication module 204 had to be selected for both the desired external communication protocol (e.g. communication protocol used to communicate with the utility computer system 110), as well as ensuring that the communication module 204 was capable of communicating using either the ANSI or IEC protocol used by the meter as well as the utility system. The metering system 200 allows for the communication module 204 to use either ANSI or IEC protocols. Specifically, the memory 214 includes an interpreter module 218 which is configured to process both ANSI and IEC messages. The interpreter module 218 is configured to determine the type of message (e.g. ANSI or IEC) and process the message accordingly. The interpreter module 218 is further configured to package response messages for transmission by the communication module 204 to respond in kind to the received message (e.g. using ANSI or IEC, as applicable). In one embodiment, the interpreter module 218 may use an Intimate Communications Hub Interface Specification (ICHIS) to interpret the received messages. These processes are described in more detail below.

Figure 3:
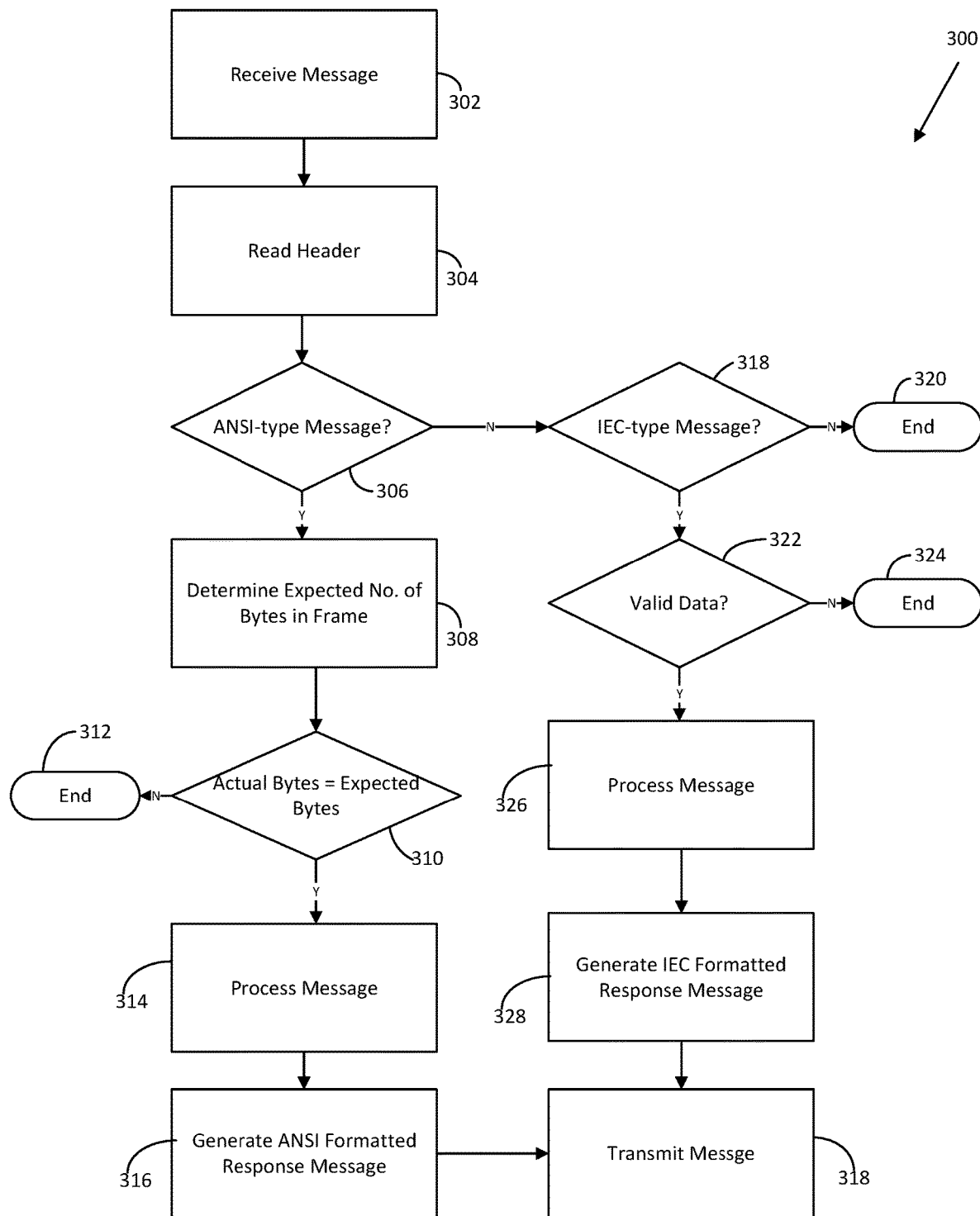
FIG. 3 is a block diagram illustrating one exemplary embodiment of an incoming message interpretation process, according to the description.

Turning now to FIG. 3, a flow chart illustrating a process 300 for processing messages received at a meter, such as meter 202, is described, according to some embodiments. For clarity, the process 300 will be described as being carried out by the components and systems described in regards to FIGS. 1 and 2 above. However, it is understood that other configurations of the above described metering systems may also be used to perform the below described process. It is also understood that while the below process 300 describes the interpretation of specific message types (e.g. ANSI and IEC), other message types are also contemplated. At process block 302, a message is received at the meter 202. In one embodiment, the message is first received by a communication module, such as communication module 204 described above. The communication module 204 may receive a wireless and/or wired message from a utility computer system, such as utility computer system 110, and provide the message to a communication module interface, such as communication module interface 210, using a serial connection as described above. The message may then be received by the interpreter module 218 of the meter 202 for processing.

At process block 304, the interpreter module 218 reads a header portion (i.e. "frame") of the received message. As described above, the message may be an ANSI-type message or an IEC-type message. The communication module 204 may be protocol agnostic, and passes the messages directly to the meter 202, and the associated interpreter module 218. In other embodiments, the communication module 204 may utilize a specific communication protocol. In some embodiments, the first byte of the messages may comprise the header, which is evaluated by the interpreter module 218 to determine the type of message received. For example, IEC-type messages (e.g. DLMS/COSEM) may always have a header which starts with 0x7E. Conversely, ANSI-type messages may have multiple header values, such as 0xEE, 0x06, and/or 0x15. In response to the header not matching either the IEC-type or ANSI-type messages, the interpreter module 218 may determine whether the last received frame was an IEC-type message, and if so, determine that the current message is an IEC-type message. Based on determining that the previous frame was not an IEC-type message, and that the header does not match up to either an IEC-type message or an ANSI-type message, the interpreter module 218 may determine that the received message is not a supported message type.

At process block 306, the interpreter module 218 determines whether the message is an ANSI-type message, such as by evaluating the header information as described above. Based on the interpreter module 218 determining that the message is an ANSI-type message, the interpreter module 218 then determines the expected number of bytes within the message at process block 308. In some embodiments, the interpreter module 218 may determine the expected number of bytes by evaluating the header information. At process block 310, the interpreter module 218 determines whether the number of actual bytes of the received message equals the determined expected number of bytes. Based on determining that the actual number of bytes do not equal the expected number of bytes, the process 300 ends at process block 312. In response to determining that the actual number of bytes does equal the expected number of bytes, the received message is processed at process block 314 as an ANSI-type message. In one embodiment, the received message may include one or more requests for information from the meter 202, such as status information, usage information, etc.

At process block 316, the interpreter module 218 generates an ANSI formatted response message in response to the ANSI-type message being processed at process block 316. For example, the ANSI formatted response message may be configured to include data in response to the one or more requests for information within the received message. The ANSI formatted response message is then transmitted at process block 318. In one embodiment, the response message may include specific data, parameters, or the status of a procedure that were requested in the received message. For example, the received message may include a request for the meter 202 to execute a procedure and the meter then responses with a status message, such as done/successful, attempted but failed, unable to process, unknown request, etc.

Returning to process block 306, based on the interpreter module 218 determining that the received message is not an ANSI-type message, the interpreter module 218 then determines whether the message is an IEC-type message at process block 318 by reading the header information, as described above. In some embodiments, the interpreter module 218, in response to not being able to determine if the message is an IEC-type message based on the header information, evaluates if a previous message was an IEC-type message, and then determines that the received message is an IEC-type message based on the previous message being an IEC-type message. In response to the interpreter module 218 determining that the message is not an IEC-type message, the process 300 ends at process block 320. In response to the interpreter module 218 determining that the message is an IEC-type message, the interpreter module 218 then determines whether the data within the IEC-type message is valid at process block 322. In one embodiment, the validity of the IEC-type message is determined using a Frame Check Sequence of the lower layers of the DLMS protocol (such as HDLC). For example, when a message is received, a calculation is performed on the data within the message and the result is verified against a value embedded in the frame. If the result doesn't match, the message is considered invalid. In response to the interpreter module 218 determining that the data is not valid, the process 300 ends at process block 324. In response to the interpreter module 218 determining that the IEC-type message is valid, the message is processed at process block 326 by the interpreter module 218. In one embodiment, the received message may include one or more requests for information from the meter 202, such as status information, usage information, etc.

At process block 328, the interpreter module 218 generates an IEC formatted response message in response to the IEC-type message being processed at process block 326. For example, the IEC formatted response message may be configured to include data in response to the one or more requests for information within the received message. The IEC formatted response message is then transmitted at process block 318. In one embodiment, the response message may include specific data, parameters, or the status of a procedure that were requested in the received message. For example, the received message may include a request for the meter 202 to execute a procedure and the meter then responses with a status message, such as done/successful, attempted but failed, unable to process, unknown request, etc.

What is claimed is:

1. A metering system, comprising:
a utility meter comprising a processing circuit and a communication module interface;
a communication module electronically coupled to the utility meter via the communication module interface, the communication module configured to transmit information to, and receive information from, the utility meter;
the processing circuit of the utility meter comprising one or more electronic processors configured to:
receive a first message from the communication module;
read a header frame of the first message;
determine a message type of the first message based on the header frame, wherein the determined message type is one of an ANSI-type message and an IEC-type message;
verify the first message based on the determined message type; and process the first message based on the determined message type,
wherein the determined message type is determined to be an IEC-type message based on an immediately preceding message being an IEC-type message.

2. The system of claim 1, wherein the electronic processors are further configured to:
generate a second message in response to the first message;
format the second message into a message type that is the same as the determined message type; and
transmit the second message to the communication module.

3. The system of claim 2, wherein the communication module is configured to transmit the second message to a utility computing device.

4. The system of claim 3, wherein the utility computing device is a meter reading device.

5. The system of claim 1, wherein the header frame is one byte in length.

6. The system of claim 1, wherein the determined message type is determined to be an ANSI-type message based on the header frame equaling one of 0xEE, 0x06, and 0x15.

7. The system of claim 1, wherein the determined message type is determined to be an IEC-type message based on the header frame equaling 0x7E.

8. The system of claim 7, wherein the IEC-type message is a DLMS/COSEM message type.

9. The system of claim 1, wherein the utility meter is an electric meter.

10. A method for processing multiple message protocols within a utility metering device, the method comprising:
receiving a first message at a communication module, the communication module in electronic communication with a utility meter;
reading a header frame of the first message at an electronic processor of the utility meter;
determining a message type of the first message based on the header frame at the electronic processor of the utility meter, wherein the determined message type is one of an ANSI-type message and an IEC-type message;
verifying the first message based on the determined message type at the electronic processor of the utility meter;
processing the first message at the electronic processor of the utility meter based on the determined message type;
generating a second message in response to the first message;
formatting the second message into a message type that is the same as the determined message type; and
transmitting the second message to the communication module;
wherein the determined message type is determined to be an IEC-type message based on an immediately preceding message being an IEC-type message.

11. The method of claim 10, wherein the determined message type is determined to be an ANSI-type message based on the header frame equaling one of 0xEE, 0x06, and 0x15.

12. A metering system, comprising:
a resource meter comprising a processing circuit and a communication module interface;
a communication module electronically coupled to the resource meter via the communication module interface, the communication module configured to transmit information to, and receive information from, the resource meter;
the processing circuit of the resource meter comprising one or more electronic processors configured to:
receive a first message from the communication module;
read a header frame of the first message;
determine a message type of the first message based on the header frame,
wherein the message type is one of an ANSI-type message and an IEC-type message; verify the first message based on the determined message type;
process the first message based on the determined message type;
generate a second message in response to the first message;
format the second message into a message type that is the same as the determined message type; and
transmit the second message to the communication module;
wherein the determined message type is determined to be an ANSI-type message based on the header frame equaling one of 0xEE, 0x06, and 0x15, and the determined message type is determined to be an IEC-type message based on the header frame equaling 0x7E.

13. The metering system of claim 12, wherein the communication module is configured to transmit the second message to a utility computing device.

* * * * *